United States Patent [19]

Bauer et al.

[11] Patent Number: 4,645,637
[45] Date of Patent: Feb. 24, 1987

[54] MANIPULATOR FOR THE INSPECTION OF PRESSURE VESSELS OPEN AT THE TOP THEREOF

[75] Inventors: Rainer Bauer, Herzogenaurach; Hans Kastl, Erlangen, both of Fed. Rep. of Germany

[73] Assignee: Kraftwerk Union Aktiengesellschaft, Mülheim, Fed. Rep. of Germany

[21] Appl. No.: 699,086

[22] Filed: Feb. 7, 1985

[30] Foreign Application Priority Data

Feb. 16, 1984 [DE] Fed. Rep. of Germany ....... 3405851

[51] Int. Cl.⁴ .............................................. G21C 17/00
[52] U.S. Cl. .................................................... 376/249
[58] Field of Search .......................... 376/249; 59/78.1

[56] References Cited

U.S. PATENT DOCUMENTS

| | | | |
|---|---|---|---|
| 3,546,875 | 12/1970 | Weber | 59/78.1 |
| 3,862,578 | 1/1975 | Schluter | 376/249 |
| 3,863,770 | 2/1975 | Shallenberger et al. | 376/249 |
| 4,165,254 | 8/1979 | Reyes | 376/249 |

FOREIGN PATENT DOCUMENTS

| | | |
|---|---|---|
| 1935360 | 2/1970 | Fed. Rep. of Germany . |
| 2154015 | 10/1973 | Fed. Rep. of Germany . |
| 2325388 | 9/1976 | Fed. Rep. of Germany . |
| 2547472 | 4/1977 | Fed. Rep. of Germany . |

*Primary Examiner*—Salvatore Cangialosi
*Attorney, Agent, or Firm*—Herbert L. Lerner; Laurence A. Greenberg

[57] ABSTRACT

Manipulator for carrying out measurements, tests, inspections and repairs in an open-top reactor pressure vessel comprising a manipulator bridge movable along the auxiliary bridge a platform with a substructure disposed above the manipulator bridge a non-rotating boom supported by a bearing surface supported by the platform, the boom projecting into the pressure vessel, guide rails disposed over the entire length of the boom, a U-shaped channel disposed over the length of the boom a boom bearing including a cylindrical part on the substructure, two roller guides inside the cylindrical part, a retaining mechanism for the boom, a carriage including a sleeve tube enclosing the boom braced against the boom, rollers guiding the tube, a fixed support ring, a rotatable support ring, a supporting member supported about the carriage for equipment, drives for the supporting members a load lifting device moving the carriage along the boom including cable drums cables wound on the drums with a free end fastened to a bracket of the carriage, a horizontal guide track disposed in the manipulator bridge between the cable drums, a cable guide chain disposed on the guide track passing through the U-shaped channel and having an end fixed to the carriage power and control lines for the carriage and the supporting member disposed in the cable guide chain and a cable storage device disposed on the auxiliary bridge and coupled to the manipulator bridge including a drivable cable drum for winding and unwinding the cable chain.

7 Claims, 15 Drawing Figures

MANIPULATOR FOR THE INSPECTION OF PRESSURE VESSELS OPEN AT THE TOP THEREOF

The invention relates to remotely operable devices for measuring, testing, inspecting, and repairing equipment disposed in places which are hard to directly reach manually or which can only be reached under difficult conditions, the device is to be used when constructing a manipulator used inside an open-top reactor pressure vessel and it substantially includes a boom projecting into the pressure vessel and a carriage which can travel along the boom, to which a supporting structure for measuring, testing, inspecting, or repairing equipment is fastened.

In a conventional manipulator for the pressure vessel of a nuclear reactor, the boom rests on the bottom of the pressure vessel and is held at its upper end by means of a manipulator trolley anchored in the upper platform of a manipulator bridge. The manipulator bridge can in turn travel along an auxiliary bridge supported in the reactor building. The stationary boom includes a carriage which can travel in the longitudinal direction of the boom by means of a hoisting device. A cable winch provided for this purpose is formed of two cable drums disposed tangentially and symmetrically to the boom, the free ends of cables being fastened to the carriage. One of the cables passes around a deflection pulley at the base of the boom. In addition, the carriage supports a horizontal arm which is movable in the longitudinal direction and is rotatable about its own axis. Repair and monitoring equipment can be mounted to the free end of the arm, as disclosed in German Patent DE-PS No. 23 25 388, corresponding to U.S. application Ser. No. 466,494, filed Feb. 5, 1974.

In another known manipulator of this kind, the carriage is formed of a tube which encloses the boom over its entire length and is rotatably mounted in a manipulator bridge which is constructed in the form of a table. The manipulator bridge also contains drives for axially moving the tube. The drives engage gear teeth disposed on the outside of the tube through pinions. Furthermore, a jib or traverse which is movable in longitudinal direction and is pivotable about a horizontal axis, is fastened to the tubular carriage. The drives provided therefor are supplied through power and control cables which are unwound from a cable drum disposed on the manipulator bridge and are driven by an electric motor, as described in German Patent DE-PS No. 25 47 472.

In another known manipulator, the boom is suspended from the manipulator bridge, is rotated from the bridge about its axis and is moved in axial direction (by means of a cable pull). The jib or traverse for the testing equipment, which is fastened to the boom without a separate carriage or support, is operated, among other things, by cable drives disposed inside the boom;, as described in German Patent DE-PS No. 21 54 015, corresponding to U.S. Pat. No. 3,862,578.

It is accordingly an object of the invention to provide a manipulator for the inspection of pressure vessels open at the top thereof, which overcomes the hereinafore-mentioned disadvantages of the heretofore-known devices of this general type, such as that shown in German Patent DE-PS No. 23 25 388, and to construct the drive mechanism for the carriage and the power supply for the units mounted on the carriage, so that the susceptibility to trouble for the manipulator as a whole, the setup times required, and therefore the dwelling time inside the reactor pressure vessel can be reduced, thereby improving its operability and service friendliness.

With the foregoing and other objects in view there is provided, in accordance with the invention, a manipulator for carrying out measurements, tests, inspections and repairs in an open-top reactor pressure vessel disposed in a reactor building having an auxiliary bridge with main beams, comprising:

a manipulator bridge to be disposed on and movable along the longitudinal direction of the auxiliary bridge;

a raised table-type platform with an under or substructure disposed above the manipulator bridge;

a bearing surface supported by the platform;

a non-rotating boom supported by the bearing surface, the boom projecting into the pressure vessel for deposition therein, two guide rails diametrically disposed over the entire length of the boom, a channel having a U-shaped cross-section being disposed over the entire length of the boom;

a boom bearing including a substantially hollow cylindrical part resting on the substructure, two roller guides diametrically disposed inside the cylindrical part for the guide rails, a retaining mechanism for axially positively fixing the boom in place in a force-locking or form-locking manner;

a carriage including a length of tube enclosing the boom in the form of a sleeve braced against the boom, rollers guiding the tube along the guide rails, a fixed support ring fastened to the tube, a rotatable support ring mounted on the fixed support ring, a supporting member rotatably supported about the carriage on the rotatable support ring for accommodating measuring, testing, inspecting and repairing equipment, drives for the supporting member carried by the rotatable support ring, and a bracket;

a load lifting device moving the carriage along the boom, the lifting device including two drivable cable drums tangential and symmetrical to the boom in vicinity of the platform and offset 90° relative to the U-shaped channel, the cable drums having axes parallel to the main beams of the auxiliary bridge below the platform in the substructure, cables wound on the drums, each cable having a free end fastened directly to the bracket of the carriage forming two independently drivable cable winches;

a horizontal guide track disposed in the manipulator bridge level with the substructure between the cable drums facing away from the U-shaped channel, a cable guide chain disposed on the guide track passing through the U-shaped channel and having an end fixed to the carriage;

power and control lines for the carriage and the supporting member disposed in the cable guide chain; and a cable storage device to be disposed on the auxiliary bridge and coupled to the manipulator bridge in longitudinal direction of the auxiliary bridge, the cable storage device including a drivable cable drum for winding and unwinding the cable guide chain.

When constructed as described above, the manipulator can be disposed in several operative units for transport and assembly purposes, each being readily accessible during assembly, disassembly and operation of the manipulator. These units are the manipulator bridge without a lower catwalk, the boom bearing and the upper platform railing, but with the carriage or support hooked in below the substructure, including a jib or traverse and a cable winch for the carriage; the lower catwalk with the boom bearing and the upper platform railing; the cable storage device with the cable drum, the cable guide chain and the drives for cable drum and cable guide chain; the frame for the boom sections with the various boom sections; and a service cart which can be rolled to the manipulator bridge. When assembling the manipulator, these functional units are handled as follows:

1. The manipulator bridge, the lower catwalk, the boom bearing and the upper platform railing are assembled to the manipulator bridge at a preassembly site.
2. The manipulator bridge completed in this way is assembled to the auxiliary bridge present in the reactor building.
3. Then the cable storage device is assembled to the auxiliary bridge and coupled to the manipulator bridge.
4. Next, the frame for the boom sections with the boom sections is assembled to the auxiliary bridge.
5. The assembly of the boom sections with the help of the crane in the building or else with the help of a rotary column crane which can be put on the manipulator bridge subsequently follows.
6. The service cart is subsequently suspended from the auxiliary bridge.
7. Insertion of the cable guide chain into the horizontal guide channel and into the U-shaped channel of the boom, coupling the cable guide chain to the carriage and connecting the cable couplings.
8. Unlocking the carriage transport safety device.
9. Connecting the cable storage device to the manipulator control devices and running the test program.
10. Centering the manipulator in the reactor pressure vessel by moving the auxiliary bridge and the manipulator bridge.

In accordance with another feature of the invention, the cable storage device includes a drive shaft of the cable drum, a friction clutch connected to the drive shaft, and a direct drive connected to the clutch for driving the cable guide chain.

In accordance with a further feature of the invention, the end of the cable guide chain is fastened to the lower end of the carriage.

In accordance with an added feature of the invention, the table-type platform of the manipulator bridge has four legs, the substructure of the platform includes beams extended from the legs toward the center of the substructure, and the substructure further includes a hexagonal support box having a bore formed therein for the boom and a diagonal or normal to its axis extended parallel to the main beams of the auxiliary bridge.

In accordance with an additional feature of the invention, there is provided a rack disposed alongside the boom, and a transmitter being fastened to the carriage for engaging the rack and determining the height of the carriage.

In accordance with yet another feature of the invention, there is provided a clamping device mounted to the carriage having jaws associated with one of the guide rails of the boom.

In accordance with a concomitant feature of the invention, the retaining mechanism includes at least one bushing fastened to the hollow cylindrical part and at least one plug-in bolt guided radially relative to the boom in the bushing and being pluggable into corresponding holes formed in the boom.

It is therefore characteristic of the manipulator according to the invention that the drive sets of the support member are controlled through lines integrated in a cable guide chain and that the overall structure of the manipulator eliminates all guidance problems of the cable guide chain. The structural features essential for accomplishing this are the U-shaped channel in the boom and the substructure provided for the upper platform of the manipulator bridge, accommodating the elements for the retention of the boom and for the carriage drive in a specific relationship. The U-shaped channel in the boom is expediently formed of one or more sheet metal parts welded into a longitudinal slot in the tubular boom or in the various boom sections, whereas beams are provided for the under or substructure of the upper manipulator bridge platform.

Cable guide chains are known from German Published, Non-Prosecuted Application DE-OS No. 19 35 360, corresponding to U.S. Pat. No. 3,546,875.

Other features which are considered as characteristic for the invention are set forth in the appended claims.

Although the invention is illustrated and described herein as embodied in a manipulator for the inspection of pressure vessels open at the top thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1A:
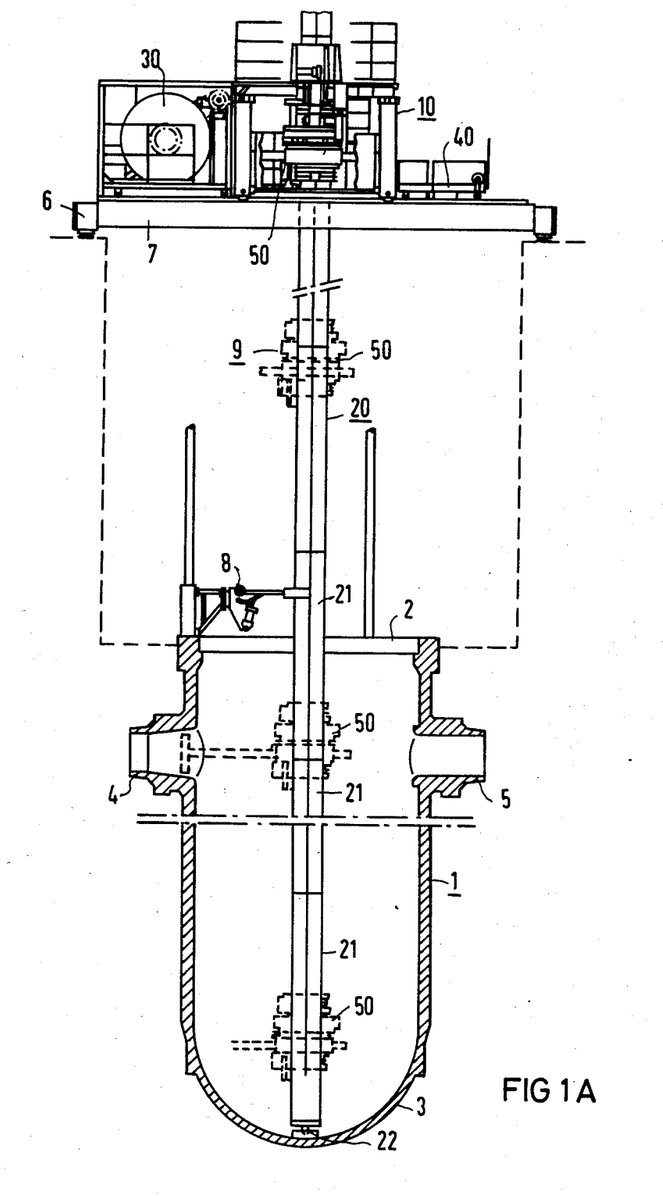
FIG. 1A is a diagrammatic, partly cross-sectional elevational view of the manipulator of the invention as a whole.

Referring now to the figures of the drawings in detail and first particularly to FIG. 1A thereof, there is seen an overall view of a reactor pressure vessel 1 with an associated center boom manipulator 9. The cover of the reactor pressure vessel 1, which has a hemispherical bottom region 3 and coolant nozzles 4 and 5, has been removed so that the pressure vessel is accessible through an upper opening 2. A boom 20 extends into the reactor pressure vessel, so that its base 22 rests on the bottom region or cup 3. The upper end of the boom 20 is held by a manipulator bridge 10 which is mounted to beams 7 of an auxiliary bridge 6. The auxiliary bridge 6 is in turn movable perpendicular to the drawing plane in a nonillustrated reactor building. The beams 7 are constructed as rails along which the manipulator bridge 10 with an associated cable storage device 30 and an associated service cart 40 are movable parallel to the drawing plane.

In order to center the boom 20, which is formed of several boom sections 21, a centering mechanism 8 mounted to the flange of the opening 2, may be provided in the reactor pressure vessel. This centering mechanism should be provided especially when the boom cannot be supported in the reactor vessel, and therefore it is suspended from the manipulator bridge.

A carriage 50 which is movable along the boom 20 and is equipped with a support member for repair, measuring, inspection or test equipment, is provided for inspection, repair and measuring purposes.

Figure 1B:
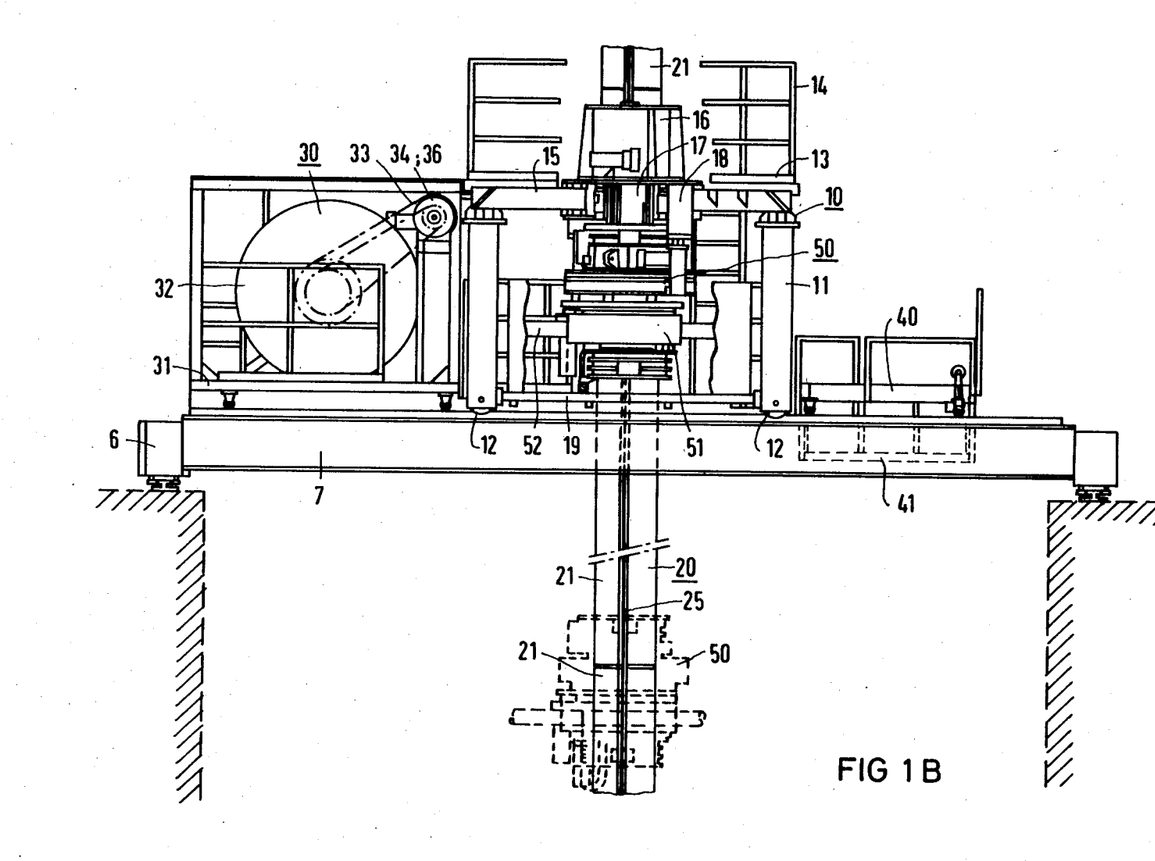
FIG. 1B is a fragmentary elevational view of the manipulator on an enlarged scale.

According to FIG. 1B, which shows the manipulator bridge 10 separately, the bridge is formed of a table-like structure with four legs 11, having wheels 12 at the lower ends thereof. A table top or upper platform 13 which has a railing 14 is provided in the upper part of the table-like structure. Below the table top is a substructure 15. A boom bearing 16 is mounted to the substructure 15 and cable drums 17 with separate drives 18 for the stroke of the carriage 50 are mounted in the substructure 15. The carriage 50 is equipped with a support member 51, in which a jib or traverse 52 is mounted. In addition, the lower region of the manipulator bridge is provided with cross or stiffening beams 19, on which a nonillustrated lower platform rests.

Moreover, the boom 20, formed of the various boom sections 21, is provided with two diametrically opposed guide rails 25 for guiding the carriage or support 50.

On one side of the manipulator bridge the cable storage device 30 is mounted to the auxiliary bridge 6. The cable storage device 30 is essentially formed of a carriage 31 with a spool 32 mounted thereon. A cable guide chain 33 can be wound on the spool. A drive 34, 36 directly driving the cable guide chain 33 is provided for winding and unwinding.

The service cart 40 disposed on the other side of the manipulator bridge 10 is constructed such that the surface 41 on which it stands is located below the lower platform mounted to the cross beams 19 of the manipulator bridge in order to provide convenient access to the respective testing, measuring or repairing equipment attached to the carriage 50. Due to the table-like construction of the manipulator bridge 10, the carriage 50 can be completely run into the manipulator bridge from below.

Figure 2:
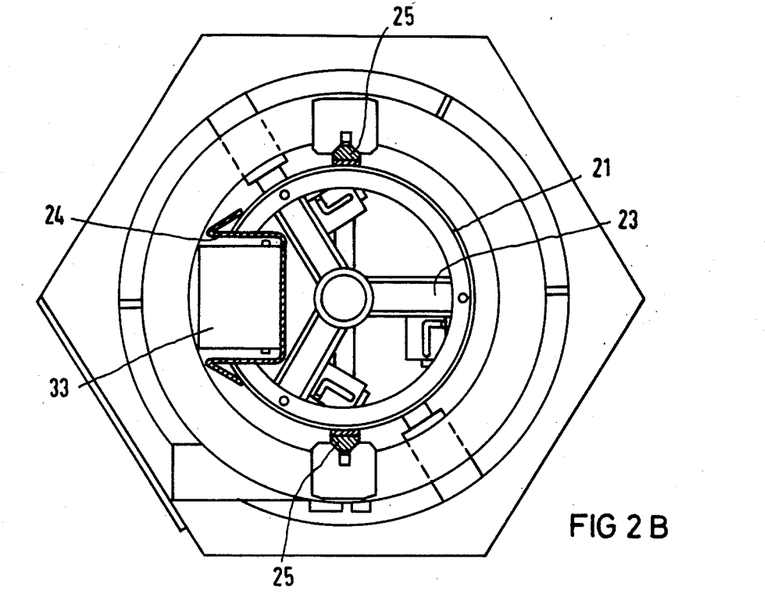
FIGS. 2A, 2B and 3 through 13 are views of individual functional units of the device.
Figure 2A:
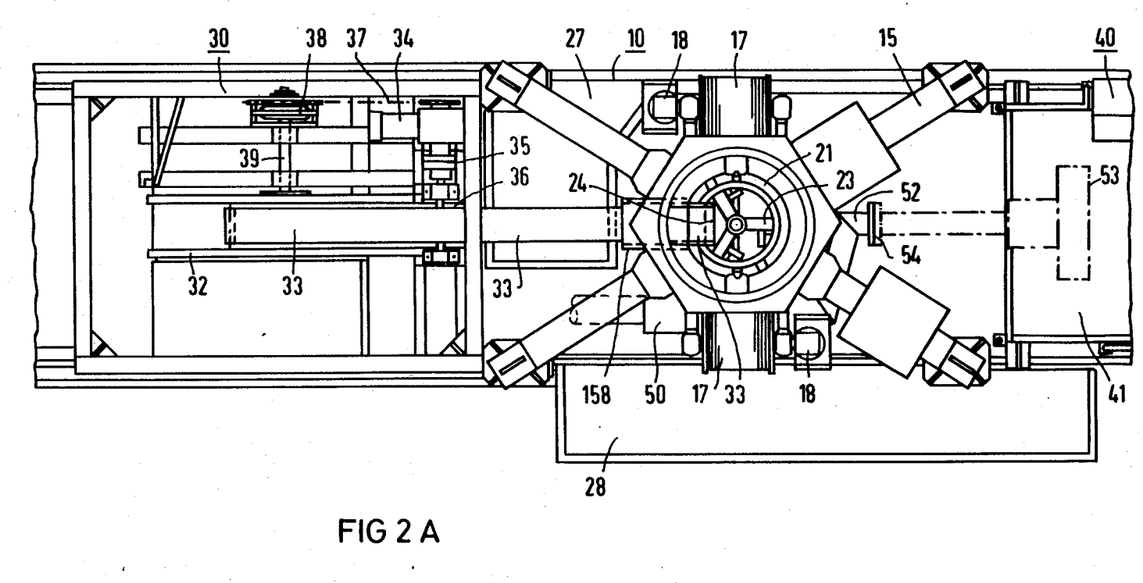

The top plan view of the manipulator bridge shown in FIGS. 2A and 2B illustrates further details of the overall structure. For example, with respect to the cable storage device, FIG. 2 shows that the cable guide chain 33 which is windable on the spool 32, is driven by the drive 34 through a clutch 35 and a pinion 36, while the spool 32 is simultaneously driven by a drive belt 37, a clutch 38 and a shaft 39.

With respect to the service cart 40, it may be seen that the measuring, testing, or repairing equipment 53 attached to the end of the jib or traverse 52 of the carriage 50 is located in the service cart area above the surface 41 and can be dismounted from the jib 52 at a flange 54.

The manipulator bridge 10 itself is shown without the upper platform so that the substructure 15, lower platforms 27 and 28 located on the beam system 19, and an individual boom section 21 are visible. When additionally considering FIG. 2B, it may be seen that each boom section has a star-shaped supporting member 23 at its upper and its lower end serving for the mutual locking of the individual boom sections. It may also be seen that the individual boom sections have two diametrically opposed guide rails 25 at the outside thereof which engage corresponding counterguides. It may furthermore be seen that an individual boom section, formed of a tube, has a slot into which a U-shaped sheet metal channel 24 is welded in order to guide the cable guide chain 33.

Figure 3:
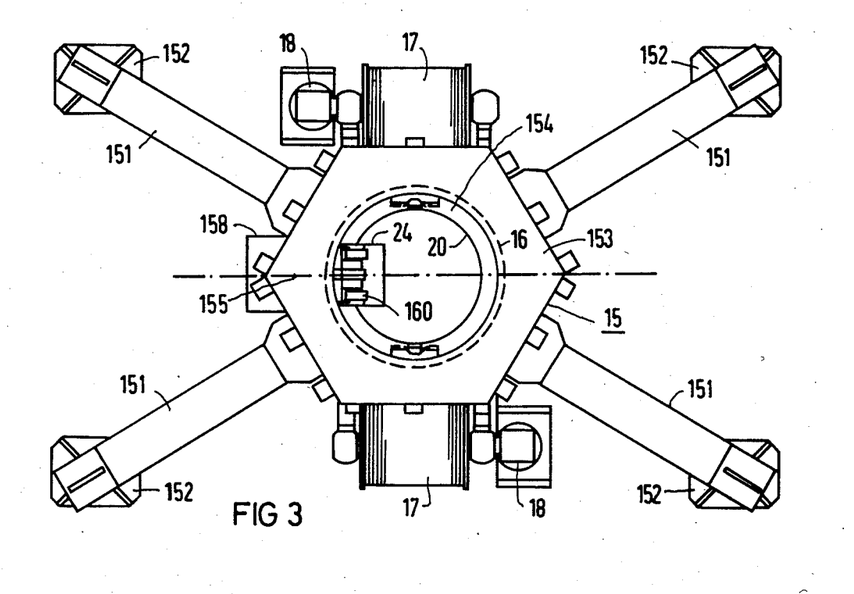
Figure 4:
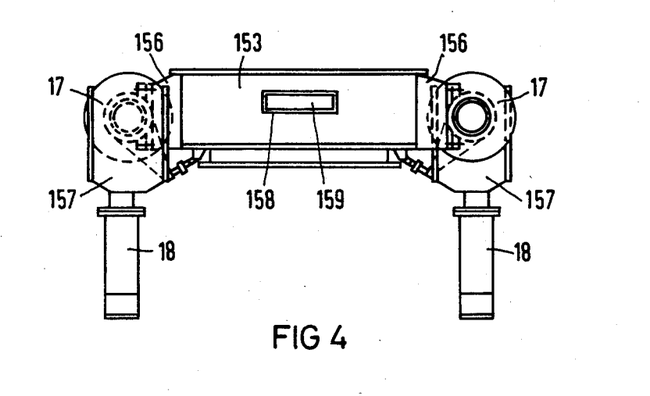

In a separate illustration, FIGS. 3 and 4 show respective top plan and side-elevational views of the substructure 15 which accommodates the boom bearing 16 and the cable drums 17 with their associated drives 18. The substructure 15 is formed of four beams 151 running diagonally with respect to the upper table top of the manipulator bridge. The outer ends of the beams have fastening plates 152 in order to fix the beams to the legs 11 of the table-like manipulator bridge while their inner ends are fastened to the lateral surfaces of a hexagonal support box 153. The support box has a bore or leadthrough 154 for the boom 20 and is disposed in such a way that its diagonal or normal to its axis 155 runs parallel to the beams 7 of the auxiliary bridge 6. This achieves the result that a beam ends on each of two respective adjacent lateral surfaces of the hexagonal support box 153 while mutually opposite cable drums 17 are disposed in vicinity of the two other lateral surfaces. Overall, the construction is such that the U-shaped guide channel 24 of the boom 20 is offset by 90° relative to the cable drums 17 in vicinity of the support box 153.

According to FIG. 4, the cable drums 17 with their associated drives 18 and gear boxes 157 are fastened to the hexagonal support box 153 by brackets 156. A rectangular guide channel 159 is also provided for the insertion of the cable guide chain into the U-shaped sheet metal channel 24 through the support box. The rectangular guide channel 159 is welded into a slot 158 in the support box 153. The guide channel also has deflection rolls 160 which reorient the cable guide chain from the horizontal to the vertical. Otherwise the chain runs horizontally and, hence, parallel and symmetrical to the axis 155.

Figure 5:
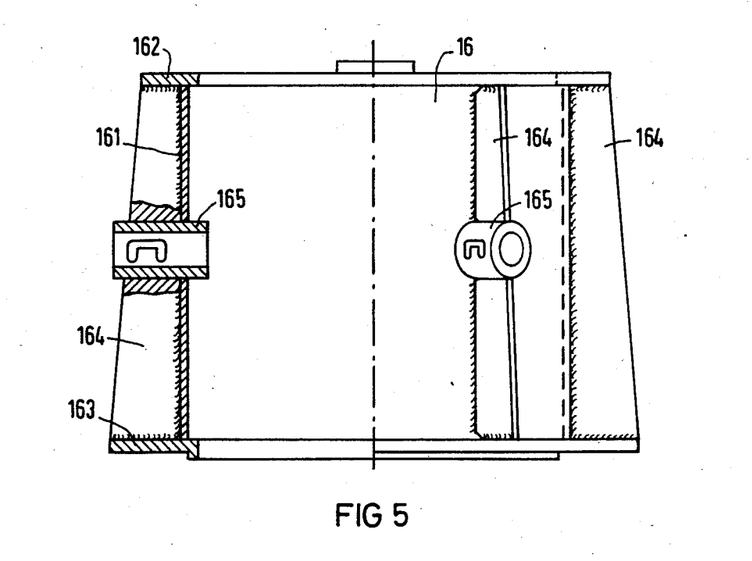
Figure 6:
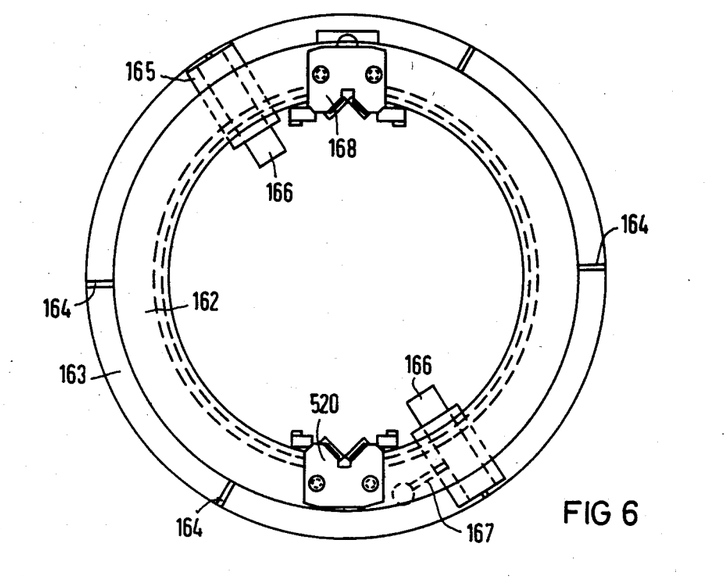

The boom bearing 16 resting on the substructure 15 is shown in FIGS. 5 and 6 in a respective half-section and top plan view. According to FIGS. 5 and 6, the boom bearing is formed of a cylindrical length of tube 161 provided with an upper ring collar 162 and a lower ring collar 163 and is stiffened by ribs 164. The wall of the tube section 161 includes horizontal guide bushings 165 connected to the ribs 164 which have bolts 166 disposed therein so that they can be moved and locked by means of a guide lever 167. The bolts 166 can engage corresponding holes in the various boom sections 21 of the boom 20, thereby fixing the boom as a whole in the vertical direction, especially during assembly. These guide bushings and bolts, which serve at the same time for the vertical mounting of the boom if the boom operates in the suspended operating mode, form a locking device for the axial fixation of the boom. Instead of a locking device acting in a form-locking manner, e.g. in the form of a ratchet or other locking gear, a device acting in a force-locking manner, e.g. in the form of a brake, may also be considered. A form-locking connection is one in which the shape of two parts locks them together, whereas a force-locking connection requires outside force.

Figure 7:
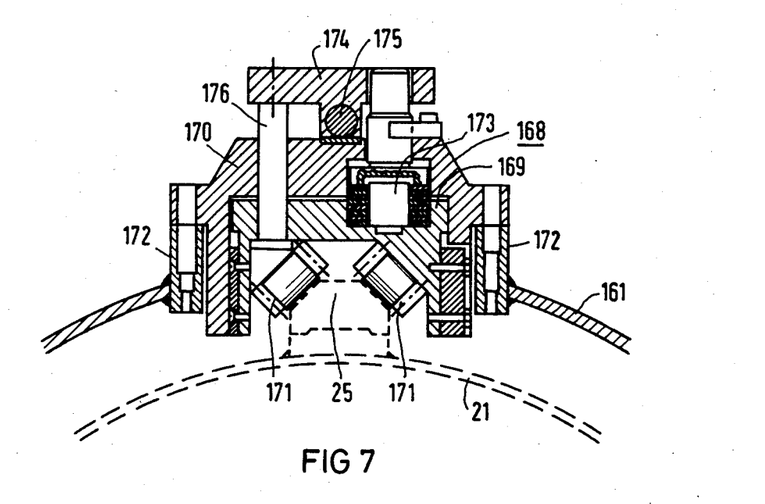
Figure 8:
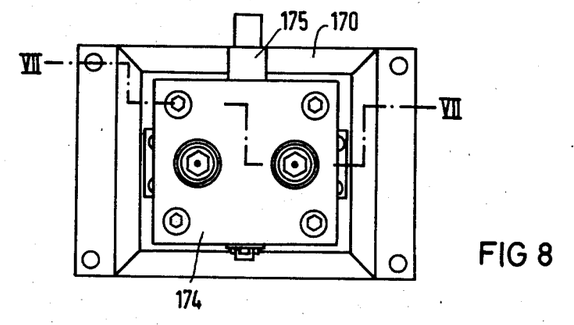
Figure 12:
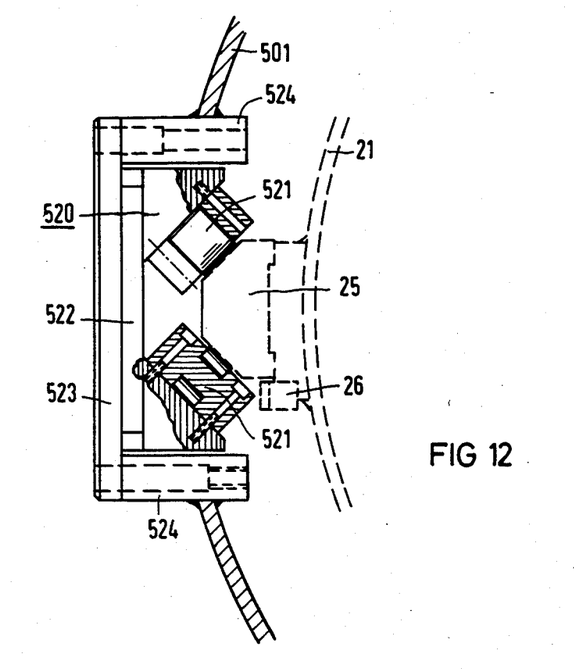

Disposed on the length of the tube 161 of the boom bearing 16 in diametrically opposed position are a spring-loaded roller guide 168 and a fixed roller guide 520, both being engaged by the guide rails 25 of the boom sections when inserting the boom sections in the boom bearing. The spring-loaded roller guide 168 according to FIGS. 7 and 8, is formed of two roller bodies 171 fastened to a support plate 169. The roller guide 168 is elastically mounted in the base plate 170 by means of a spring arrangement 173 or the like. The base plate 170 is attached to brackets 172 welded into a slot in the cylindrical length of tube 161 of the boom bearing. In order to retract the spring-loaded roller body 171 when assembling the first boom section, an eccentric bolt 175 is provided which is guided in a plate 174. Bolts 176 which engage the support plate 169 from the back are fastened to this plate. The fixed roller guide is described below with reference to FIG. 12.

Figure 9:
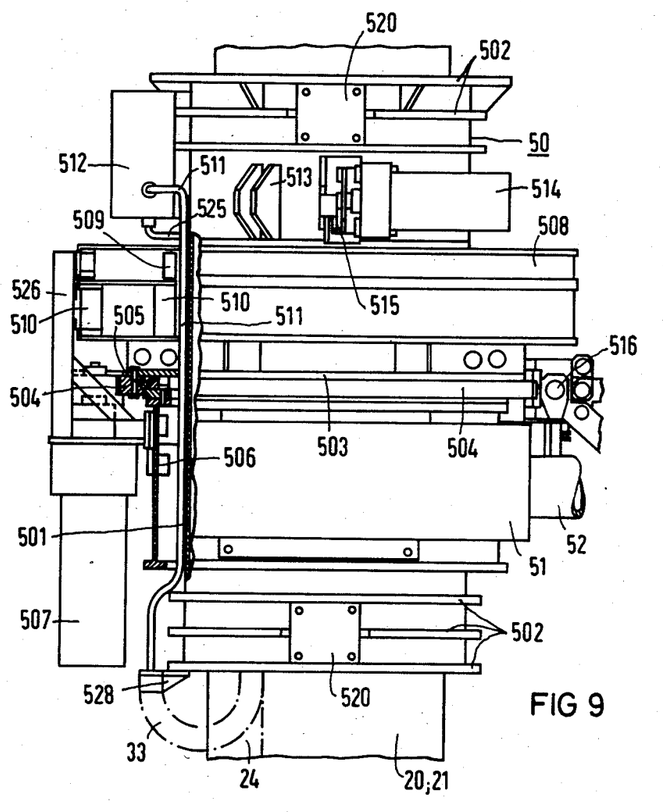
Figure 10:
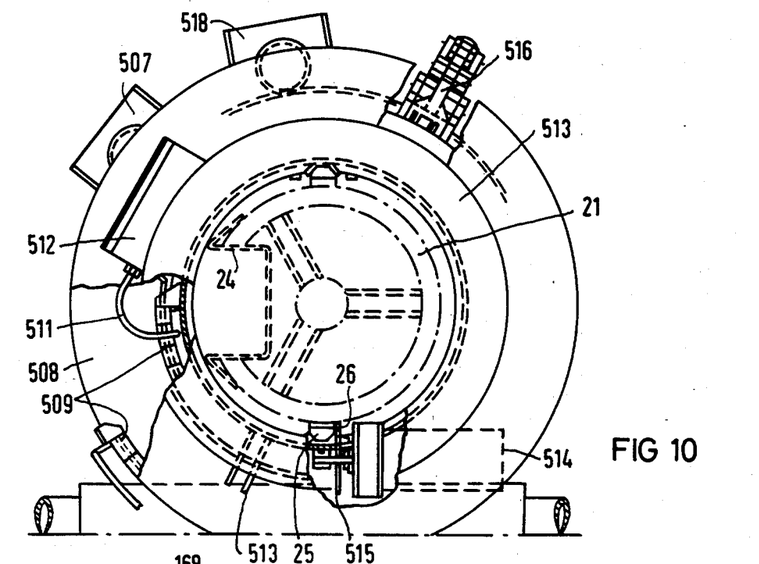

According to FIGS. 9 and 10, one essential component of the carriage 50 is a cylindrical length of tube or housing 501 which is reinforced and stiffened by circular ribs 502 forming a base part. This base part supports all other components of the carriage and encloses the boom 20 including the U-shaped sheet metal channel 24 in which the cable guide chain 33 is inserted. The chain is fixed to a bracket 528 at the lower end of the carriage with non-illustrated plug connections provided at the transition from the cable guide chain to the carriage for supply lines guided in the cable chain. During the operation of the center boom manipulator, the cable guide chain 33 is inserted essentially over its entire length in the U-shaped sheet metal channel 24, resulting in a shorter or longer loop of the cable guide chain 33 at the lower end of the carriage, depending on the position of the chain.

A stationary support ring 503 which supports a spur gear 504, is fastened to the length of tube 501 of the carriage 50. A support ring 506 is mounted to the inside of the spur gear by a ball bearing 505. The support ring 506 can rotate about the length of tube 501 and support the supporting member 51 for the jib 52, among other things. A motor 507 having a pinion which meshes with the spur gear 504 is also mounted to this rotatable support ring. In addition, a transmitter 518 (see FIG. 10) for position sensing during the rotary motion of the rotatable support ring 506 is associated with the motor 507. Furthermore, a brake and locking device 516 having jaws which engage the spur gear 504 is mounted to the rotatable support ring 506.

An annular box 508 is joined to the housing 501 of the support or carriage 50. Superposed on the box 508 are two cable guide chains 509 and 510 having supply lines 525 which are connected on one hand to the cable guide chain 33 through a control box 512 and a connecting line 511, and on the other hand are connected to the units mounted to the rotatable support ring 506 through a connecting device 526.

Figure 11:
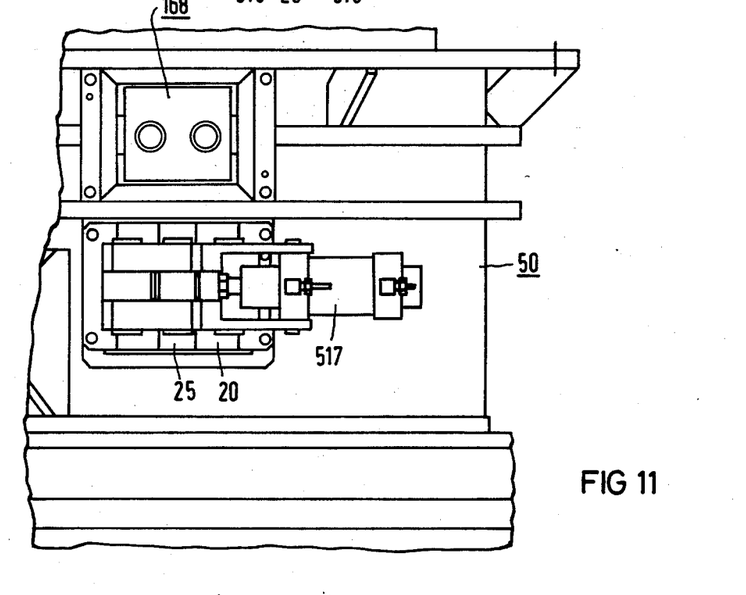

The housing 501 of the carriage 50 is also provided in two opposite positions with brackets 513. Each of the brackets is fastened to one free end of the cables wound on the cable drums 17 to raise and lower the carriage. Additionally provided at the level of these brackets is a transmitter 514 having a gear 515 which engages a rack 26 (see FIG. 10) disposed adjacent a guide rail 25 of the boom 20, thus picking up the respective height position of the carriage 50. Opposite the transmitter 514, according to FIG. 11, is a clamping device 517 which can be operated hydraulically and has clamping jaws associated with the guide rail 25 of the boom 20. By means of this clamping device, the carriage is locked in the respectively desired height position.

Diagonally oppositely mounted to each of the upper and lower ends of the carriage housing 501 are two roller guides which are coordinated with the two guide rails 25 of the boom 20. The roller guides associated with one guide rail are spring-loaded in the same manner as the roller guides 168 in the boom bearing 16, whereas the two roller guides 520 associated with the other guide rail are rigid or stationary, according to FIG. 12. Rollers 521 provided for the guide rails are located in a support plate 522 fixed by means of a base plate 523 to brackets 524 welded into a recess in the tube section 501.

Figure 13:
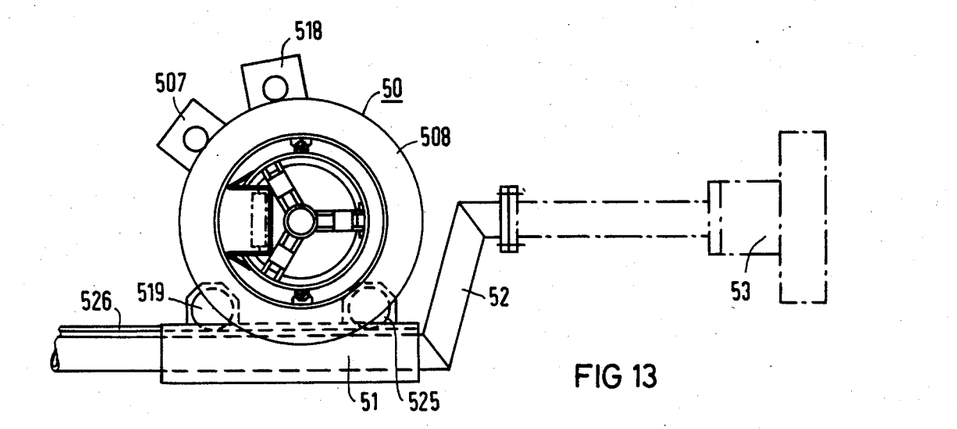

According to FIG. 13, which is a top view of the carriage 50, a lifting device 519 having a pinion which engages the rack 526 is provided. A linear transmitter 525 is associated with the drive 519. The device 519 is provided for the jib 52 with test equipment 53 brought to a supporting member 51.

The foregoing is a description corresponding in substance to German application No. P 34 05 851.6, filed Feb. 16, 1984, the International priority of which is being claimed for the instant application, and which is hereby made part of this application. Any material discrepancies between the foregoing specification and the aforementioned corresponding German application are to be resolved in favor of the latter.

We claim:

1. Manipulator for carrying out measurements, tests, inspections and repairs in an open-top reactor pressure vessel disposed in a reactor building having an auxiliary bridge with main beams, comprising:

a manipulator bridge disposed on and movable along the longitudinal direction of the auxiliary bridge;

a table-type platform with a substructure disposed above said manipulator bridge;

a bearing surface supported by said platform;

a non-rotating boom supported by said bearing surface, said boom projecting into the pressure vessel for deposition therein, two guide rails diametrically disposed over the entire length of said boom, a channel having U-shaped cross-section being disposed over the entire length of said boom;

a boom bearing including a substantially hollow cylindrical part resting on said substructure, two roller guides diametrically disposed inside said cylindrical part for said guide rails, a retaining mechanism for axially positively fixing said boom in place;

a carriage including a length of tube enclosing said boom in the form of a sleeve braced against said boom, rollers guiding said tube along said guide rails, a fixed support ring fastened to said tube, a rotatable support ring mounted on said fixed support ring, a supporting member rotatably supported about said carriage on said rotatable support ring for accommodating measuring, testing, inspecting and repairing equipment, drives for said supporting member carried by said rotatable support ring, and a bracket;

a load lifting device moving said carriage along said boom, said load lifting device including two drivable cable drums tangential and symmetrical to said boom in vicinity of said platform and offset 90° relative to said U-shaped channel, said cable drums having axes parallel to the main beams of the auxiliary bridge below said platform in said substructure, cables wound on said drums, each cable having a free end fastened directly to said bracket of said carriage forming two independently drivable cable winches;

a horizontal guide track disposed in said manipulator bridge level with said substructure between said cable drums facing away from said U-shaped channel, a cable guide chain disposed on said guide track passing through said U-shaped channel and having an end fixed to said carriage;

power and control lines for said carriage and said supporting member disposed in said cable guide chain; and a cable storage device disposed on the auxiliary bridge and coupled to said manipulator bridge in longitudinal direction of the auxiliary bridge, said cable storage device including a drivable cable drum for winding and unwinding said cable guide chain.

2. Manipulator according to claim 1, wherein said cable storage device includes a drive shaft of said cable drum, a friction clutch connected to said drive shaft, and a direct drive connected to said clutch for driving said cable guide chain.

3. Manipulator according to claim 1, wherein said end of said cable guide chain is fastened to the lower end of said carriage.

4. Manipulator according to claim 1, wherein said table-type platform of said manipulator bridge has four legs, said substructure of said platform includes beams extended from said legs toward the center of said substructure, and said substructure further includes a hexagonal support box having a bore formed therein for said boom and a diagonal extended parallel to the main beams of the auxiliary bridge.

5. Manipulator according to claim 1, including a rack disposed alongside said boom, and a transmitter being fastened to said carriage for engaging said rack and determining the height of said carriage.

6. Manipulator according to claim 1, including a clamping device mounted to said carriage having jaws associated with one of said guide rails of said boom.

7. Manipulator according to claim 1, wherein said retaining mechanism includes at least one bushing fastened to said hollow cylindrical part and at least one plug-in bolt guided radially relative to said boom in said busing and being pluggable into corresponding holes formed in said boom.

* * * * *